Aug. 9, 1966  M. A. E. VUICHARD  3,265,345
SEAT SUSPENSION FOR A TRACTOR AND THE LIKE
Filed May 13, 1965
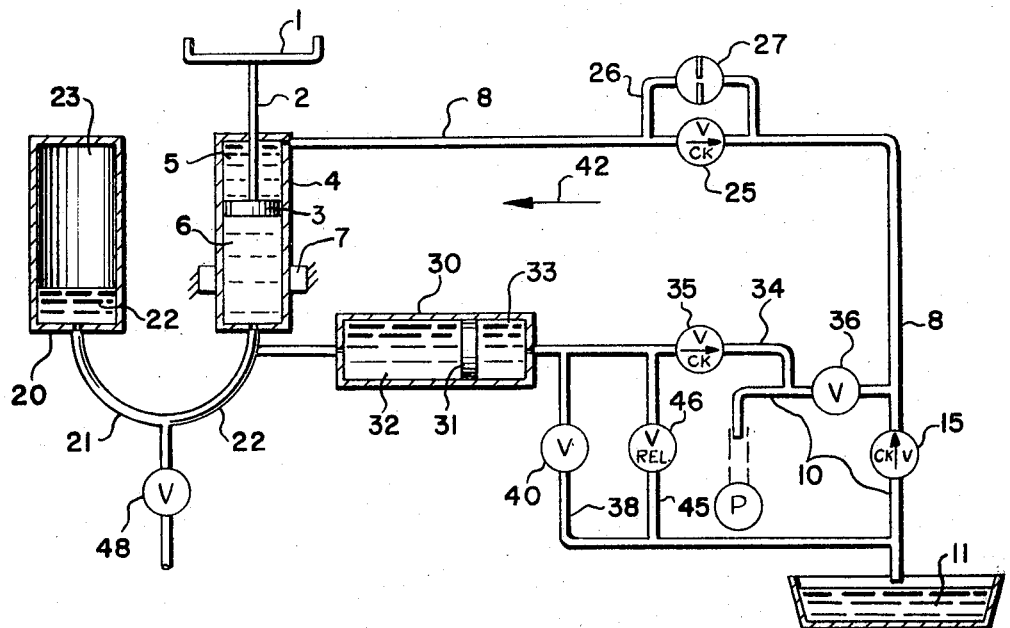
FIG.1
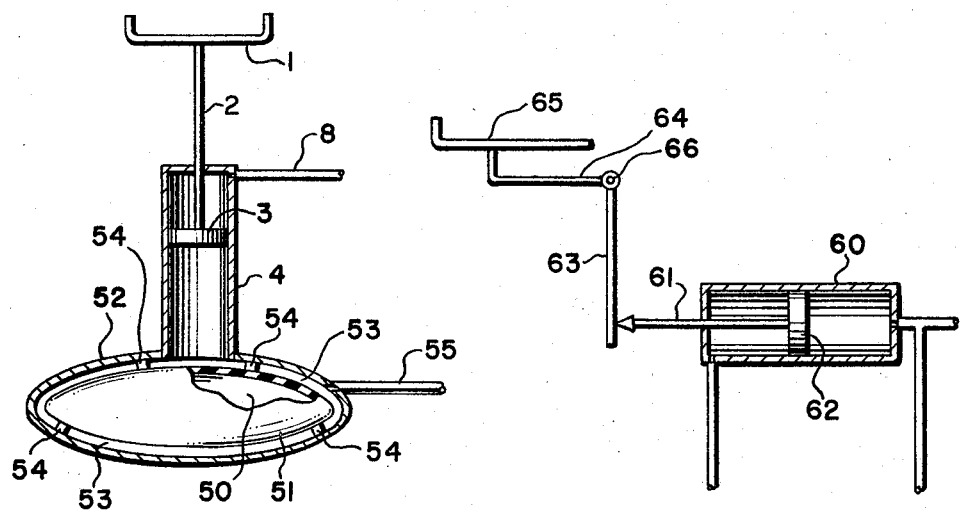
FIG.2
FIG.3
INVENTOR
MICHEL ANTOINE EMILE VUICHARD
BY
Kelman and Berman
AGENTS

United States Patent Office 3,265,345
Patented August 9, 1966

3,265,345
SEAT SUSPENSION FOR A TRACTOR
AND THE LIKE
Michel A. E. Vuichard, Jurens, Haute Savoie, France
(Jurens par Valleiry, Haute Savoie, France)
Filed May 13, 1965, Ser. No. 455,658
Claims priority, application France, May 14, 1964, 898
8 Claims. (Cl. 248—400)

This invention relates to automotive vehicles, and particularly to a seat suspension for a tractor or similar vehicle.

The driver's seat in a conventional tractor of the type used in agriculture and the like is not equipped with a seat suspension, or has a suspension which is not capable of protecting the driver or operator from severe vertical oscillations when the vehicle travels over rough ground. The jolting received by the driver in operating the tractor is not only tiresome, but it also unfavorably affects the work performed.

It is the primary object of the invention to provide a tractor with a seat suspension that adequately protects the driver against jolting.

Another object is the provision of a hydro-pneumatic seat suspension whose elasticity and damping characteristics can be adjusted readily.

The seat suspension of the invention relies for operativeness on a source of fluid under pressure such as a pump or a tank filled with hydraulic liquid under pressure which are normally available on a farm tractor, a Caterpillar truck, an automotive scraper, and other similar vehicles. The hydraulic fluid may be drawn from the return line of a control circuit employed for setting plow shares, harrows, and the like. A check valve which is preferably adjustable may be inserted in the available hydraulic circuit to provide operating fluid at constant pressure to the suspension arrangement if the pressure in the hydraulic circuit is subject to frequent changes.

Other features, objects, and attendant advantages of this invention will be readily appreciated as the same becomes better understood by reference to the following detailed description when considered in connection with the accompanying drawings in which:

FIG. 1 shows the hydraulic circuit of a seat suspension of the invention, the view being in elevation and partly diagrammatic;

FIG. 2 shows a modified detail of the apparatus of FIG. 1; and

FIG. 3 illustrates a detail of yet another modification of the apparatus of FIG. 1.

Referring now to the drawing in detail, and initially to FIG. 1, there is seen the seat pan 1 of a tractor not otherwise shown in detail. The pan is normally covered with a nonillustrated cushion on which the driver is seated during the operation of the vehicle. The pan 1 is supported on an upright bar 2 which movably passes in sealing engagement through an end wall of a cylinder 4, and is fastened to a piston 3 in the cylinder. The piston divides the cylinder 4 into two compartments 5 and 6. The cylinder is attached to the nonillustrated body of the tractor by brackets 7.

A supply conduit 8 connects the compartment 5 with a hydraulic circuit of the tractor of which only a pump P, a return line 10, and an open sump 11 are illustrated. A check valve 15 interposed between the junction of the conduit 8 and the open discharge end of the return line 10 is arranged to maintain a predetermined fixed operating pressure in the conduit 8 under all normal operating conditions of the hydraulic circuit which may actuate a scraper blade or like implement, or merely energize the brakes or the steering system of the tractor in a known manner.

By way of example, the check valve may be equipped with a spring-loaded ball, the spring being selected to open the valve at a minimum pressure of 5 kg./cm.$^2$, which is below the normal operating pressure of the associated hydraulic circuit. In an actual embodiment of this invention, such an operating pressure has been applied to a piston 3 having an effective area of 5 cm.$^2$. Other dimensional features of this specific embodiment will be set forth hereinbelow, but it will be understood that other dimensions may be selected according to principles well understood in this art without departing from the spirit of this invention.

A check valve 25 in the supply conduit 8 permits flow in the conduit inward of the compartment 5 if the pressure in the cylinder 4 is only slightly lower than in the return line 10. A bypass 26 around the check valve 25 is equipped with a throttle 27 whose aperture is substantially smaller than that of the open valve 25, and may be adjustable if so desired.

The compartment 6 of the cylinder 4 communicates with a closed surge tank 20 and with an auxiliary cylinder 30 through a conduit 21. A free piston 31 in the cylinder 30 divides the same into two compartments 32, 33, the compartment 32 being connected with the cylinder 4 and the tank 20 by the conduit 21 at all times. A body 22 of liquid (oil or hydraulic fluid) completely fills the compartments 6 and 32 and the conduit 21. It traps a cushion 23 of compressed air or nitrogen in the closed end of the tank 20. A tap on the conduit 21 is normally closed by a valve 48.

A conduit 34 connects the compartment 33 of the auxiliary cylinder 30 with a portion of the return line 10 upstream from the junction with the conduit 8. Another conduit 38 connects the compartment 33 to a portion of the return line 10 downstream from the check valve 15 and near the open discharge end of the return line. A normally open control valve 36 is arranged in the return line 10 between its junctions with the conduits 8 and 34. The latter is equipped with a check valve 35 which permits selective liquid flow inward of the cylinder 30 from the line 11 at a pressure of at least 6 kg./cm.$^2$.

Another control valve 40 in the conduit 38 is normally closed and is by-passed by a conduit 45 in which a safety valve 46 is arranged to connect the compartment 33 with the sump 11 if the pressure in the auxiliary cylinder 30 exceeds 20 kg./cm.$^2$.

The capacity of the surge tank 20 is 450 cm.$^3$ in the afore-mentioned specific embodiment, and the volume of the liquid body 22 is selected in such a manner that the gas body 23 occupies ⅚ of the surge tank when the piston 3 is in its uppermost position. The conduit 21 has an internal diameter of over 13 mm. which is sufficient to avoid all significant damping effects due to friction of the liquid moving in the conduit 21.

The afore-described seat suspension operates as follows:

The normally constant pressure maintained by the check valve 15 in the supply conduit 8 is applied to the piston 3 and is counteracted by the pressure of the gas cushion 23. The seat pan 1, when not occupied, assumes an inoperative position which is determined by the applied opposite forces. When occupied by a driver, the seat pan assumes another position, downwardly spaced from the inoperative position by a distance determined by the driver's weight, and additional liquid is supplied to compartment 4 at constant pressure.

The equilibrium established by the static forces enumerated above is disturbed by dynamic effects when the tractor travels over uneven ground. As the tractor moves over a projecton, the seat pan 1 moves downward, the gas cushion 23 is compressed, and the cylinder 4 draws liquid from the return line 10 until the pressure set in the valve 15 is restored.

Upon the rebound, the gas cushion 23 expands, driving liquid out of the compartment 4 against the constant pressure in the supply line 8. The return flow of liquid in the line 8 quickly closes the check valve 25, and further flow must pass through the throttle 27 which thus prevents oscillation of the seat pan in the manner of a dash pot by preventing a rapid rise of the pan.

It will be appreciated that at least some advantages of this invention are available if the check valve 25 and throttle 27 are omitted because of the damping effect inherent in the liquid system contained in the cylinder 4 and the conduit 8. A damping effect closely similar to that of the illustrated embodiment would be achieved if the check valve 25 and nozzle 27 were arranged in the conduit 21 between the cylinder 4 and the surge tank 20. In either case, downward movement of the piston 3 would be permitted by the valve and throttle to proceed substantially freely, whereas upward movement of the piston would be braked.

The embodiment of the invention whose dimensional features were cited above has been found satisfactory under most operating conditions with a static load of 60 to 130 kg. on the driver's seat even when not equipped with the check valve 25 and throttle 27. The ride, however, is improved by the additional damping provided by the valve and throttle.

The response characteristics of the apparatus shown in FIG. 1 may be varied by an auxiliary fluid circuit which includes the tank 30 and permits the interface of liquid and gas in the surge tank 20 to be adjusted. When the normally open control valve 36 is closed, pressure in the return line 10 upstream from the valve 36 increases, and the check valve 35 is ultimately opened to admit liquid to the compartment 33, thereby to shift the piston 31 in the direction of the arrow 42 to drive liquid from the compartmetn 32 into the tank 20, and further to compress the gas cushion 23. Damage to the apparatus by excessive liquid pressure is prevented by the safety valve 46 which opens before the pressure in the tank 30 reaches a dangerous level. As soon as desired conditions in the tank 20 have been reached, the valve 36 is opened again, and the check valve 35 prevents return flow of liquid in the conduit 34.

If the gas pressure in the tank 20 is higher than is consistent with the driver's comfort, liquid may be drained from the compartment 33 through the valve 40. The valves 36 and 40 are preferably arranged within reach of the driver while he is seated on the pan 1, and adjustment of the elastic properties of the seat arrangement may thus be made while the tractor is operating. Higher pressure in the tank 20 gives a harder ride, and vice versa, as will be obvious.

Gas lost by leakage of diffusion from the tank 20 may be replaced from a pressure tank or the like connected to the tap valve 48.

All liquid is preferably withdrawn from the surge tank 20 before admitting gas through the valve 48. This is readily achieved by draining the compartment 33 and by removing all weight from the pan 1. The entry of gas into the compartments 6 and 32 from the valve 48 is prevented by suitably tilting the apparatus.

FIGS. 2 and 3 illustrate respective details of modified devices of the invention which are identical with the apparatus shown in FIG. 1 except for the features specifically illustrated and described below.

In the modified seat suspension shown in FIG. 2, the compartment of the cylinder 4 under the piston 3 is axially open and directly communicates with a tank 52 of rigid metal construction which is of elliptical cross section in all vertical planes. A sealed bag 51 of synthetic rubber is centered in the tank 52 by spacers 54, and is filled with compressed air 50. The lower compartment of the cylinder 4, the space 53 between the bag 51 and the inner wall of the tank 52, and a communicating conduit 55 are filled with hydraulic fluid. The conduit 55 is connected to the auxiliary cylinder 30, not itself visible in FIG. 2.

The apparatus illustrated in FIG. 2 operates in a manner so closely analogous to that shown in FIG. 1 as not to require a detailed description of its functions. The body 50 of compressed air in the resilient bag 51 is the full equivalent of the air cushion 23 in the afore-described surge tank 20.

The device illustrated in FIG. 3 has a cylinder 60 having a horizontal axis which replaces the upright cylinder 4 shown in FIG. 1. Vertical movements of a seat pan 65 are transmitted to an axially movable piston 62 in the cylinder 60 by a linkage which includes a piston rod 61 slidably sealed into the head of the cylinder 60 and fastened to the piston 62, and a lever whose pivot 66 is attached to the tractor frame in a conventional manner, not shown. The seat pan 65 is attached to one arm 64 of the lever, whereas the other arm 63 abuttingly engages the piston rod 61 to drive the rod inward of the cylinder 60 when the seat pan 65 moves downward, and to raise the seat pan in response to outward rod movement.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. In a seat suspension arrangement for a vehicle, in combination:
   (a) seat pan means for carrying the operator of the vehicle;
   (b) a cylinder enclosing a cavity;
   (c) a piston movable in said cavity and dividing the same into two compartments,
      (1) said cylinder and said piston constituting two members of a fluid-pressure operated device;
   (d) fastening means for fastening one of said members to said vehicle;
   (e) motion transmitting means connecting said seat pan means to the other one of said members for relative movement of said members when said seat pan means moves relative to the vehicle;
   (f) a source of fluid under substantially constant pressure communicating with one of said compartments, said source including a pump, a conduit connected to said pump and having a discharge opening, and check valve means interposed in said conduit between said pump and said opening and responsive to a predetermined pressure for opening said conduit to flow from said pump to said opening, said one compartment communicating with a portion of said conduit intermediate said pump and said check valve means;
   (g) a gas cushion under pressure; and
   (h) pressure transmitting means for transmitting the pressure of said cushion to said piston in the other one of said compartments.

2. In an arrangement as set forth in claim 1, said one member being said cylinder.

3. In an arrangement as set forth in claim 1, a container, said gas cushion being arranged in said container, and said pressure transmitting means including a body of liquid, said body substantially filling said other compartment and the portion of said container not occupied by said gas cushion.

4. In a seat suspension arrangement for a vehicle, in combination:
   (a) seat pan means for carrying the operator of the vehicle;
   (b) a cylinder enclosing a cavity;

(c) a piston movable in said cavity and dividing the same into two compartments,
  (1) said cylinder and said piston constituting two members of a fluid-pressure operated device;
(d) fastening means for fastening one of said members to said vehicle;
(e) motion transmitting means connecting said seat pan means to the other one of said members for relative movement of said members when said seat pan means moves relative to the vehicle;
(f) a source of fluid under substantially constant pressure communicating with one of said compartments;
(g) a container;
(h) a gas cushion under pressure arranged in said container;
(i) pressure transmitting means for transmitting the pressure of said cushion to said piston in the other one of said compartments, said pressure transmitting means including a body of liquid, said body substantially filling said other compartment and the portion of said container not occupied by said gas cushion; and
(j) adjusting means for adjusting the volume of said body of liquid, said adjusting means including an auxiliary cylinder, an auxiliary piston movable in said auxiliary cylinder and dividing the same into two auxiliary compartments, one of said auxiliary compartments communicating with said container and being substantially filled with said body of liquid, and fluid pressure means connected to the other auxiliary compartment for applying adjustable fluid pressure to said auxiliary piston.

5. In a seat suspension arrangement for a vehicle, in combination:
  (a) seat pan means for carrying the operator of the vehicle;
  (b) a cylinder enclosing a cavity;
  (c) a piston movable in said cavity and dividing the same into two compartments,
    (1) said cylinder and said piston constituting two members of a fluid-pressure operated device;
  (d) fastening means for fastening one of said members to said vehicle;
  (e) motion transmitting means connecting said seat pan means to the other one of said members for relative movement of said members when said seat pan means moves relative to the vehicle;
  (f) a source of fluid under substantially constant pressure communicating with one of said compartments, said source including
    (1) a conduit having two end portions, one of said portions being connected to said one compartment,
    (2) means for maintaining a predetermined fluid pressure in the other end portion of said conduit,
    (3) check valve means in a portion of said conduit intermediate said end portions for selectively passing fluid flow between said end portions through said check valve means when the fluid pressure in said one end portion is smaller than in said other end portion thereof, and
    (4) throttle means by-passing said check valve means and having a flow section substantially smaller than that of said check valve means;
  (g) a gas cushion under pressure; and
  (h) pressure transmitting means for transmitting the pressure of said cushion to said piston in the other one of said compartments.

6. In an arrangement as set forth in claim 4, said fluid pressure means including a conduit connecting said other auxiliary compartment with said source, and valve means for controlling the pressure of the fluid of said source.

7. In a seat suspension arrangement for a vehicle, in combination:
  (a) seat pan means for carrying the operator of the vehicle;
  (b) a cylinder enclosing a cavity;
  (c) fastening means for fastening the cylinder to said vehicle;
  (d) a piston movable in said cylinder and dividing the same into two compartments;
  (e) motion transmitting means connecting said piston to said seat pan means for movement relative to said cylinder when said seat pan means moves relative to said vehicle;
  (f) a pressure fluid system including a pump and a return conduit communicating with said pump and having a discharge opening remote from said pump;
  (g) a check valve in said conduit intermediate said pump and said opening, said check valve being responsive to a predetermined minimum pressure in a portion of said conduit upstream of said valve to connect said pump to said opening;
  (h) a supply conduit communicating with said upstream portion of said return conduit and with one of said compartments;
  (i) a check valve in said supply conduit and responsive to a fluid pressure in said upstream portion higher than the fluid pressure in said one compartment for connecting said upstream portion and said one compartment;
  (j) a container communicating with the other one of said compartments;
  (k) an air cushion partly occupying said container; and
  (l) a body of liquid substantially filling the remainder of said container and said other compartment, said air cushion and said body of liquid being in pressure-transmitting engagement in said container.

8. In an arrangement as set forth in claim 7, an auxiliary cylinder; an auxiliary piston movable in said auxiliary cylinder and dividing the same into two auxiliary compartments, one of said auxiliary compartments communicating with said other compartment of said first-mentioned cylinder and said body of liquid substantially filling said one auxiliary compartment; and valve means interposed between the other auxiliary compartment and respective portions of said return conduit upstream and downstream from said first check valve for selectively connecting said other auxiliary compartment to said return conduit portions.

References Cited by the Examiner

UNITED STATES PATENTS

| | | | |
|---|---|---|---|
| 598,982 | 2/1898 | Egger | 267—1 |
| 1,565,054 | 12/1925 | Brunker et al. | 248—400 X |
| 3,168,278 | 2/1965 | Ogden | 248—400 X |
| 3,193,239 | 7/1965 | Monroe | 248—400 |

FOREIGN PATENTS

Ad. 69,556  7/1958  France.

CLAUDE A. LE ROY, *Primary Examiner.*

R. P. SEITTER, *Assistant Examiner.*